Sept. 9, 1952 Y. SEKELLA 2,609,696
ENGINE STARTER DRIVE
Filed Sept. 26, 1946 2 SHEETS—SHEET 1

WITNESS:
Esther M. Stockton

INVENTOR.
Youston Sekella
BY
Clinton S. James.
ATTORNEY

Sept. 9, 1952  Y. SEKELLA  2,609,696
ENGINE STARTER DRIVE
Filed Sept. 26, 1946  2 SHEETS—SHEET 2

WITNESS:

INVENTOR.
Youston Sekella
BY Clinton S. James
ATTORNEY

Patented Sept. 9, 1952

2,609,696

UNITED STATES PATENT OFFICE 2,609,696

ENGINE STARTER DRIVE

Youston Sekella, Elmira, N. Y., assignor to Bendix Aviation Corporation, a corporation of Delaware Application September 26, 1946, Serial No. 699,410

8 Claims. (Cl. 74—7)

The present invention relates to engine starter drives and more particularly to automatically engageable starter gearing incorporating a friction clutch.

It is an object of the present invention to provide a novel engine starter drive incorporating a friction clutch which is normally lightly loaded, the cranking load being applied progressively without severe shock.

It is another object to provide such a device in which the load capacity of the clutch is positively limited so as to prevent the application of abnormal or shock loads to the elements of the drive.

It is a further object to provide such a device in which engagement of the drive is cushioned by the lightly loaded clutch.

It is another object to provide such a device in which the kinetic energy of the parts at the time of disengagement is dissipated by slippage of the clutch so as to prevent any tendency for the parts to rebound toward operative position.

Further objects and advantages will be apparent from the following description taken in connection with the accompanying drawing, in which.

Figure 1:
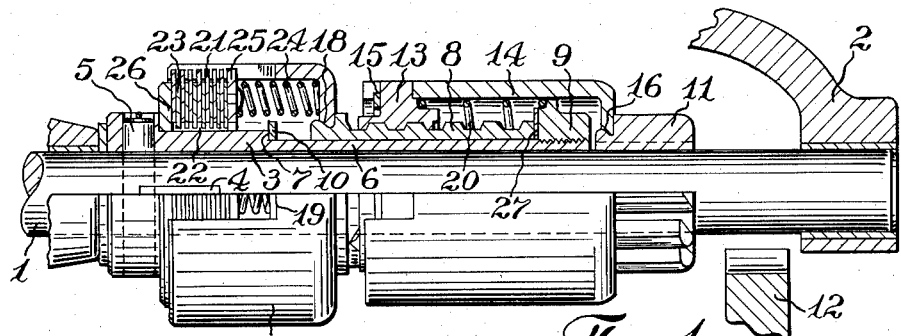
Fig. 1 is a side elevation partly broken away and in section of one preferred embodiment of the invention showing the parts in idle position.

In Fig. 1 of the drawing, there is illustrated a power shaft 1 which may be the extended armature shaft of a starting motor, the outer end of which is preferably supported in an outboard bearing 2 which may be attached to the frame of the starting motor. A sleeve 3 is fixed on the power shaft as by means of a key 4 and pin 5, said sleeve having a reduced portion 6 forming a shoulder 7, on which portion a screw shaft 8 is slidably journalled. A stop nut 9 is fixed on the end of the sleeve so as to confine the screw shaft thereon, and a thrust washer 10 is seated on the sleeve against the shoulder 7, to limit the longitudinal movement of the screw shaft.

A pinion 11 is slidably journalled on the power shaft 1 for movement into and out of mesh with a gear 12 of the engine to be started. A control nut 13 is threaded on the screw shaft 8 and is rigidly connected to the pinion by means of a barrel member 14 fixed at its ends to the control nut and pinion as indicated at 15 and 16 respectively.

Means for actuating the screw shaft from the power shaft is provided comprising a second barrel member 17 fixed as indicated at 18 to the screw shaft and provided with a series of slots 19 in which a plurality of driven clutch discs 21 are splined. The sleeve 3 is provided with splines 22 on which a plurality of driving clutch discs 23 are slidably mounted, and means comprising compression springs 24 are provided within the barrel for compressing the clutch discs between pressure plates 25 and 26 splined to the barrel and the sleeve 3 respectively.

Figure 2:
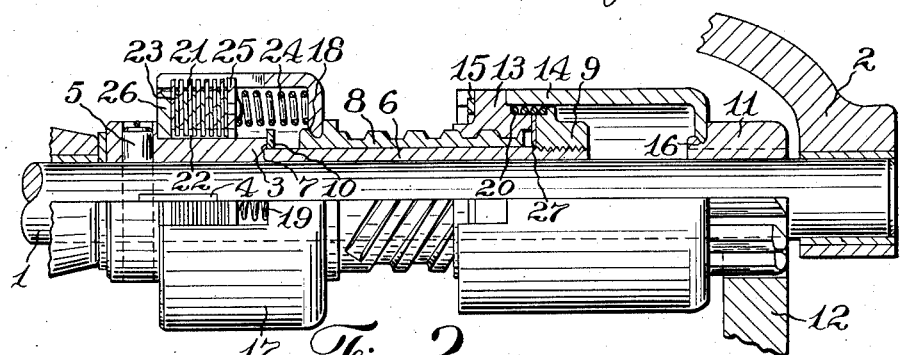
Fig. 2 is a similar view showing the parts in driving position.

In the operation of this embodiment of the invention, starting with the parts in the positions illustrated in Fig. 1, rotation of the power shaft 1 by the starting motor is transmitted through the sleeve 3, clutch 23, 21, and barrel 17 to the screw shaft 8 which accordingly causes the control nut 13 to move to the right until it engages the stop nut 9 as shown in Fig. 2 at which time the pinion 11 is fully meshed with the engine gear. Further rotation of the power shaft 1 causes the screw shaft 8 to move to the left by screw-jack action thus compressing the clutch springs and tightening the clutch until sufficient torque can be transmitted therethrough to crank the engine. The compression of the clutch springs 24 is limited by the thrust washer 10 so as to prevent the torque capacity of the clutch from exceeding a predetermined maximum, thereby protecting the drive from excessive loads by permitting the clutch to slip. The overrunning of the pinion 11 when the engine starts, assisted by the anti-drift spring 20, causes the parts to be returned to idle position, with screw shaft 8 bearing against stop nut 9.

A thrust washer 27 is preferably interposed between the end of the screw shaft and the stop nut, having such thickness as to maintain the clutch springs 24 under suitable light compression. With this arrangement, when the parts are thrown back to idle position, the lightly-loaded clutch slips and dissipates the kinetic energy of the parts, and thus prevents any tendency of the pinion to rebound into engagement with the engine gear.

Figure 3:
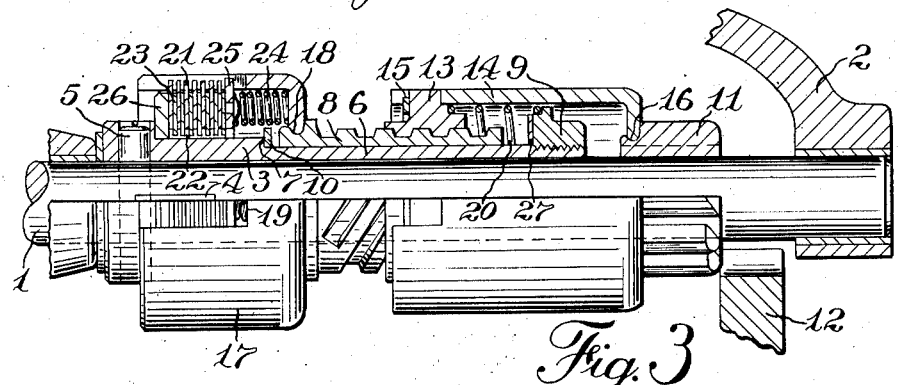
Fig. 3 is a similar view showing the parts in the positions assumed in case of tooth abutment between the drive pinion and engine gear in the meshing operation.

If, during the meshing operation, tooth abutment should occur between the pinion 11 and engine gear 12, the arresting of the longitudinal movement of the pinion will cause the screw shaft 8 to move to the left as shown in Fig. 3, thus causing the clutch springs 24 to compress the clutch discs 21, 23 until the torque transmitted therethrough becomes sufficient to rotate the screw shaft and with it the control nut 13 and pinion 11 so as to move the teeth of the pinion into proper registry with the tooth spaces of the engine gear 12. The clutch springs 24 thereupon expand and snap the pinion into initial mesh with the engine gear whereupon the meshing and cranking operations proceed as usual.

Figure 4:
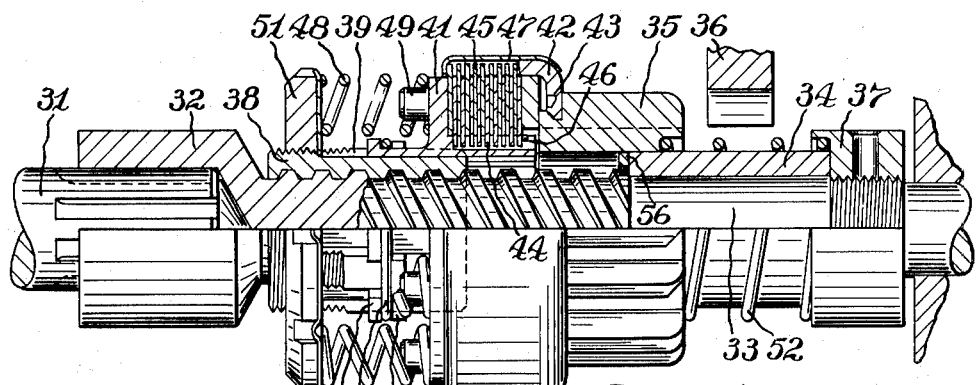
Fig. 4 is a side elevation partly in section of a second embodiment of the invention intended for heavy duty installations.
Figure 6:
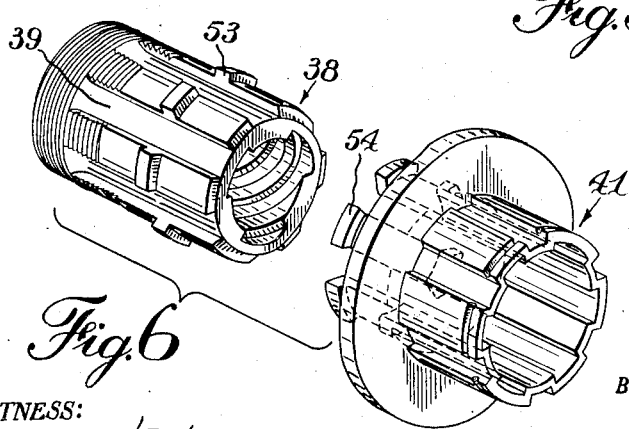
Fig. 6 is a detail in perspective of the control nut and clutch actuating member of Fig. 4.

In Figs. 4 and 6 of the drawing, there is illustrated an embodiment of the invention which is particularly adapted for the larger or heavy duty type of engine starters. As there shown, a power shaft 31 has a solid screw shaft 32 rigidly coupled thereto, the screw shaft having a reduced smooth portion 33 on which is mounted a bearing sleeve 34. A pinion 35 is slidably journalled on the bearing sleeve for movement into and out of mesh with an engine gear 36, the meshing position of the pinion being defined by a stop nut 37 fixed on the screw shaft adjacent its outer end.

Means for actuating the pinion from the screw shaft is provided comprising a control nut 38 threaded on the screw shaft and provided with external splines 39 on which a driving clutch member 41 is slidably but non-rotatably mounted. A driven clutch member in the form of a barrel 42 is fixed as indicated at 43 to the pinion 35, and a plurality of driving and driven clutch discs 44 and 45 are splined alternately to the driving and driven clutch members, the discs being retained on the driving clutch member 41 by suitable means such as a lock ring 46, and being retained within the barrel 42 by means of a sleeve 47, the edges of which are crimped down on the barrel.

A plurality of compression springs 48 are arranged to bear against the rear face of the driving clutch member 41, said clutch member being preferably provided with studs 49 acting as centering means for said springs; and a backing nut 51 for the springs is adjustably threaded on the end of the control nut 38. The control nut 38 and driving clutch member 41 are provided with radially extending lugs 53 and 54 respectively as best shown in Fig. 6, and when said parts are telescoped as shown in Fig. 4, a split lock ring 55 is snapped on the assembly between the lugs so as to hold the parts in assembled relation, and maintain initial compression of the clutch springs 48 as determined by adjustment of the backing nut 51. A thrust washer 56 is located on the screw shaft against the bearing sleeve 34 to arrest the travel of the nut 38, and thus limit the compression of the clutch springs 48. An anti-drift spring 52 is located between the pinion 35 and stop nut 37 for normally maintaining the parts in idle position.

In the operation of this embodiment of the invention, rotation of the power shaft 31 is transmitted to the screw shaft 32 which causes the control nut 38 to traverse the clutch members and pinion to the right until the pinion is fully meshed with the engine gear 36 and engages the stop nut 37. Further translation of the control nut causes the backing nut 51 thereon to compress the clutch springs 48 until the clutch is sufficiently loaded to transmit cranking torque, whereupon the rotation of the power shaft is caused to drive the engine gear. When the engine starts, the acceleration of the pinion 35 by the engine gear 36 is transmitted to the control nut 38 thus causing it to overrun the screw shaft and return the parts to idle position with the assistance of the anti-drift spring 52, the kinetic energy of the parts being dissipated by slippage of the clutch. If the shock load caused by the engagement of the drive exceeds a predetermined maximum, the nut 38 comes into engagement with the thrust washer 56, whereby the clutch springs 48 cannot be further compressed, and the clutch slips. The cranking operation thus takes place quietly and without excessive shock or stress.

If, during the meshing operation, tooth abutment should occur between the pinion 35 and the engine gear 36, compression of the clutch discs 44, 45 will take place when the longitudinal movement of the pinion is arrested, so that increased torque will be transmitted to the pinion to index it into proper registry with the tooth spaces of the engine gear. The expansion of the clutch springs 48 then snaps the pinion into mesh with the engine gear and meshing and cranking proceed as usual.

Figure 5:
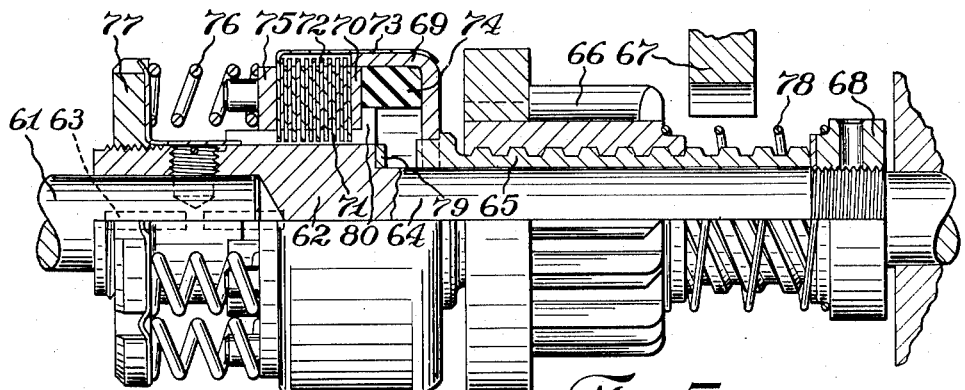
Fig. 5 is a similar view of a third embodiment of the invention, also of the heavy duty type.

In Fig. 5 of the drawing, there is illustrated a form of heavy duty drive in which the yielding clutch connection is interposed between the screw shaft and the power shaft instead of being between the control nut and pinion. As there shown, a power shaft 61 has a solid extension shaft 62 keyed thereon as indicated at 63, and the extension shaft is provided with a reduced portion 64 on which is slidably journalled a screw shaft 65. A pinion 66 is threaded on the screw shaft for movement into and out of mesh with an engine gear 67, the meshing position of the pinion being defined by a stop nut 68 fixed on the end of the extension shaft.

A barrel member 69 is fixedly mounted on the end of the screw shaft 65 in any suitable manner, and a plurality of driving clutch discs 71 and driven clutch discs 72 are splined respectively to the extension shaft 62 and barrel 69, the clutch pack being retained in the barrel by means of a sleeve 73 surrounding the barrel and enclosing the clutch discs. An annular thrust plate 70 is seated on the extension shaft 62 against a plurality of radial lugs 80 thereon, so as to confine the clutch pack on said shaft.

A ring 74 of elastically deformable material such as rubber is mounted in the barrel to form an elastic abutment for the clutch discs, and a pressure ring 75 is slidably mounted on the extension shaft 62 adjacent the open end of the barrel 69, and is pressed against the clutch discs by a plurality of springs 76, the initial pressure of which may be adjusted by means of a backing plate 77 threaded on the end of the extension shaft 62.

In operation, rotation of the power shaft 61 is transmitted through the extension shaft 62 and clutch discs 71, 72 to the barrel 69 which rotates the screw shaft 65 and thereby transverses the pinion 66 into mesh with the engine gear 67. When the pinion engages the stop nut 68, its traversal is stopped, whereupon the screw shaft 65 moves backward thus compressing the clutch discs between the rubber ring 74 and the clutch springs 76. When the loading of the clutch has thus been sufficiently increased, the rotation of the power shaft will be transmitted therethrough to rotate the pinion 66 and thereby crank the engine. If tooth abutment between the pinion and engine gear should take place during the meshing operation, the clutch is tightened in the same manner, to cause the pinion to be indexed into proper meshing relation with the engine gear, whereupon the clutch springs 76 expand and advance the pinion with the engine gear, and cranking takes place as usual.

When the engine starts, the pinion is returned to idle position where it is maintained by an anti-drift spring 78, while the screw shaft 65 is held in engagement with the stop nut 68 by the expansion of the rubber ring 74.

It will be seen that in this embodiment of the invention also, the clutch discs are normally maintained under a preset initial pressure which is sufficient to accomplish the meshing operation and to prevent, by slippage of the clutch, the rebounding of the pinion when it is thrown out of mesh. The cranking load is applied by the progressive tightening of the clutch, through the shuttling action of the screw shaft after the pinion engages the stop nut 68. In order to limit to a predetermined value the maximum torque delivered through the clutch, abutment means comprising one or more thrust rings 79 are mounted on the smooth portion 64 of extension shaft 62 in position to limit the shuttling movement of the screw shaft.

Although but three embodiments of the invention have been shown and described in detail, it will be understood that other embodiments are possible and that various changes can be made in the design and arrangement of the parts without departing from the spirit of the invention as set forth in the claims appended hereto.

What is claimed is:

1. In an engine starter drive a power shaft, a pinion mounted for longitudinal movement thereon into and out of mesh with a gear of an engine to be started, means actuated by the power shaft for traversing and rotating the pinion including driving and driven sets of spring-loaded frictionally-engaging clutch elements, a pair of inter-threaded members, and means slidably but non-rotatably connecting one of said inter-threaded members to one of said sets of clutch elements, abutment means for defining the operative position of the pinion, and means whereby longitudinal movement of said one threaded member after the longitudinal movement of the pinion is arrested by the abutment causes the spring loading of the clutch to be gradually increased.

2. An engine starter drive as set forth in claim 1, including further, means for positively limiting the loading of the clutch elements.

3. In an engine starter drive a power shaft, a pinion mounted for longitudinal movement thereon, means actuated by the power shaft for traversing and rotating the pinion including driving and driven sets of frictionally engaging clutch elements, a pair of inter-threaded members, and means slidably but non-rotatably connecting one of said inter-threaded members to one of said sets of clutch elements, spring means connected with said one threaded member for compressing the clutch elements, abutment means for defining the operative position of the pinion, and means whereby rotation of the power shaft, after the longitudinal movement of the pinion has been arrested by the abutment, causes relative longitudinal movement between the clutch elements and said one threaded member to increase the pressure of the spring means on the clutch elements.

4. An engine starter drive as set forth in claim 3, including further, means for limiting the relative longitudinal movement of the clutch elements and threaded member in order to limit the load capacity of the clutch elements.

5. In an engine starter drive, a power shaft, a pinion mounted thereon for longitudinal movement into and out of mesh with an engine gear, means for traversing and rotating the pinion including a splined connection, a friction clutch, and a threaded connection arranged in series in the line of transmission of power, spring means for loading the friction clutch, and means including said threaded connection and said splined connection for compressing the spring means after the pinion has been traversed to fully meshed position, and means for limiting the compression of the spring means so as to permit the clutch to slip when the torque exceeds a predetermined maximum.

6. An engine starter drive including a power shaft, a pinion slidably journalled thereon, a sleeve fixed to the power shaft, a screw shaft slidably journalled on the sleeve, a control nut on the screw shaft and means rigidly connecting the control nut and pinion, a stop nut on the screw shaft limiting the traversal of the control nut, a barrel member fixed to the screw shaft, driving and driven clutch discs splined alternately to the sleeve and barrel, an abutment on the sleeve limiting longitudinal movement of the clutch discs, and springs in the barrel pressing the clutch discs against said abutment.

7. An engine starter drive as set forth in claim 6, including further, an abutment on the sleeve limiting longitudinal movement of the screw shaft in the direction to compress the springs.

8. In an engine starter drive, a screw shaft, a control nut threaded thereon, a pinion slidably journalled on the screw shaft, a driving clutch member splined to the control nut, a driven clutch member fixed to the pinion, a plurality of clutch discs splined alternately to the driving and driven clutch members, spring means on the control nut compressing the discs between the driving and driven clutch members, and a stop nut on the screw shaft limiting longitudinal movement of the pinion.

YOUSTON SEKELLA.

REFERENCES CITED

The following references are of record in the file of this patent:

UNITED STATES PATENTS

| Number | Name | Date |
|---|---|---|
| 1,403,022 | Fornaca | Jan. 10, 1922 |